(12) United States Patent
Nguyen et al.

(10) Patent No.: US 12,433,213 B2
(45) Date of Patent: Oct. 7, 2025

(54) SYSTEMS AND METHODS FOR GROWING AND HARVESTING SEAWEED USING NON-PRODUCING OFFSHORE PLATFORMS

(71) Applicant: Fluor Technologies Corporation, Irving, TX (US)

(72) Inventors: Phillip Nguyen, Houston, TX (US); James Shih, Houston, TX (US); Aditya Hariharan, Katy, TX (US)

(73) Assignee: Fluor Technologies Corporation, Irving, TX (US)

( * ) Notice: Subject to any disclaimer, the term of this patent is extended or adjusted under 35 U.S.C. 154(b) by 232 days.

(21) Appl. No.: 17/744,549

(22) Filed: May 13, 2022

(65) Prior Publication Data

US 2022/0361427 A1    Nov. 17, 2022

Related U.S. Application Data

(60) Provisional application No. 63/188,899, filed on May 14, 2021.

(51) Int. Cl.
*A01G 3/00*        (2006.01)
*A01G 33/00*       (2006.01)
*B63B 35/44*       (2006.01)

(52) U.S. Cl.
CPC .......... *A01G 33/00* (2013.01); *B63B 35/4406* (2013.01)

(58) Field of Classification Search
CPC ............................ A01G 33/00; B63B 35/4406
USPC .......................................................... 47/1.4
See application file for complete search history.

(56) References Cited

U.S. PATENT DOCUMENTS

| | | | | |
|---|---|---|---|---|
| 4,084,543 A | * | 4/1978 | Pequegnat | A01K 61/60 4/488 |
| 9,995,446 B2 | * | 6/2018 | Powell | F21S 2/00 |
| 10,257,990 B1 | * | 4/2019 | Goudey | B63B 35/00 |
| 2003/0111020 A1 | * | 6/2003 | Targotay | A61P 35/00 119/200 |
| 2003/0177982 A1 | * | 9/2003 | Jenkins | A01K 61/70 119/221 |
| 2003/0206772 A1 | * | 11/2003 | Horne | B63B 35/4406 405/195.1 |
| 2008/0035070 A1 | * | 2/2008 | Harrison | A01K 61/80 119/223 |
| 2009/0235870 A1 | * | 9/2009 | Troy | F03G 7/05 119/51.01 |
| 2010/0192868 A1 | * | 8/2010 | Quinta | A01K 61/54 119/208 |
| 2013/0063930 A1 | * | 3/2013 | Dubuc | A01G 9/249 362/145 |
| 2013/0152864 A1 | * | 6/2013 | Grajcar | A01K 63/06 362/101 |

(Continued)

FOREIGN PATENT DOCUMENTS

KR            102347116 B1 *  1/2022

*Primary Examiner* — Zoe Tam Tran
(74) *Attorney, Agent, or Firm* — James A. Hooper; Thaddeus J. Faleski; Conley Rose, P.C.

(57) ABSTRACT

An offshore system for growing and harvesting seaweed. In some instances, the offshore system for growing and harvesting seaweed includes an existing non-producing offshore platform. In addition, in some instances, the offshore system for growing and harvesting seaweed includes a seaweed support system coupled to the platform and configured to support the subsea growth of seaweed.

15 Claims, 2 Drawing Sheets

(56) References Cited

U.S. PATENT DOCUMENTS

| | | | |
|---|---|---|---|
| 2014/0020283 A1* | 1/2014 | Troedsson | C12P 7/10 |
| | | | 568/877 |
| 2015/0128838 A1* | 5/2015 | Bryan | E02B 15/04 |
| | | | 114/61.1 |
| 2016/0235014 A1* | 8/2016 | Donham | A01G 7/045 |
| 2018/0139935 A1* | 5/2018 | Zheng | A01K 69/10 |
| 2019/0029231 A1* | 1/2019 | Becher | A01K 61/60 |
| 2019/0141963 A1* | 5/2019 | Zheng | B63B 1/041 |
| | | | 119/223 |
| 2019/0150382 A1* | 5/2019 | Luzuriaga | E02B 15/041 |
| 2019/0297857 A1* | 10/2019 | Vatsvåg | A01K 61/60 |
| 2021/0360905 A1* | 11/2021 | Van Leeuwen | A01K 61/60 |

\* cited by examiner

SYSTEMS AND METHODS FOR GROWING AND HARVESTING SEAWEED USING NON-PRODUCING OFFSHORE PLATFORMS

CROSS-REFERENCE TO RELATED APPLICATIONS

This application claims benefit of U.S. provisional patent application Ser. No. 63/188,899 filed May 14, 2021, and entitled "Systems and Methods for Growing and Harvesting Seaweed Using Non-Producing Offshore Platforms," which is hereby incorporated herein by reference in its entirety.

STATEMENT REGARDING FEDERALLY SPONSORED RESEARCH OR DEVELOPMENT

Not applicable.

BACKGROUND

The disclosure relates generally to systems and methods for growing and harvesting seaweed. More particularly, the disclosure relates to systems and methods for growing and harvesting seaweed using existing non-producing offshore oil and gas platforms.

Offshore seaweed growing and harvesting is gaining interest and traction globally due the ability of seaweed to absorb carbon-dioxide ($CO_2$) in the oceans, as well as to supply the growing need for seaweed in the food industry, cosmetics industry, fodder for animal rearing, and feedstock for industrial purposes. The conventional approach for producing seaweed involves growing seaweed in relatively shallow depths (up to about 5 meters) across vast swaths of ocean territory.

BRIEF SUMMARY OF THE DISCLOSURE

Embodiments of offshore systems for growing and harvesting seaweed are disclosed herein. In one embodiment, an offshore system for growing and harvesting seaweed comprises a non-producing offshore oil or gas platform disposed in a body of water. In addition, the offshore system comprises a seaweed support system coupled to the platform and configured to support the subsea growth of seaweed.

Embodiments of offshore systems for growing seaweed to reduce $CO_2$ are disclosed herein. In one embodiment, an offshore systems for growing seaweed to reduce $CO_2$ comprises a non-producing offshore oil or gas production or drilling platform disposed in a body of water. In addition, the offshore system comprises a seaweed support system coupled to the platform and configured to support the growth of seaweed within the body of water. Further, the offshore system comprises a plurality of light sources coupled to the support system in the body of water. The light sources are disposed in the body of water at a depth greater than 5 meters.

Embodiments of systems and methods for growing and harvesting seaweed are described herein. In some embodiments, a "hub" concept for growing seaweed as disclosed herein uses ocean space more efficiently than conventional approaches for growing seaweed, while offering the potential to significantly reduce project costs and implementation timelines. The hub can also be utilized for other aquaculture such as fish farming and/or industrial uses.

Embodiments described herein utilize an existing non-producing, offshore oil and/or gas platform that is reconfigured and outfitted for high density seaweed harvesting. In some embodiments, the platform is modified to accommodate multiple seaweed harvesting "lines" extending therefrom. For example, a plurality (e.g., 8-12) circumferentially spaced seaweed lines may extend up to several hundred feet laterally and radially outward from the platform. Each of the lines extending from the platform may further support a plurality of seaweed "columns" extending vertically downward therefrom. In some embodiments, the platform may also be outfitted with a renewable power source including, without limitation, solar cells, wind turbines (rotating axial and/or bladeless), tidal turbines, wave energy harnessing systems, or combinations thereof to power subsea lights to enable growth of seaweed at depths greater than the typical 4-5 m depth.

In some embodiments, the central portion of the platform serves as an aquaculture hub for fish farming or related activities, thereby creating and/or revitalizing ocean ecosystems and maximizing the use of the facility.

As will be apparent from the disclosure to follow, embodiments described herein offer the potential for the following advantages as compared to conventional techniques for growing and harvesting seaweed:

- single point/location harvesting of seaweed to reduce and/or eliminate the need for harvesting vessel(s);
- high density farming of seaweed that utilizes a three-dimensional (3D) farming space;
- reduced permitting requirements provided the farming remains within the pre-permitted "shipping exclusion" zone(s) applicable to the corresponding non-producing platform;
- efficient operations due to single operator;
- easily deployable and expandable across global locations;
- ability to co-exist with aquaculture such as fish farming;
- low energy demands via use of reliable and renewable power source(s) such as solar power, wind energy, tidal energy, or wave energy; and
- supports global climate change goals by reducing carbon footprint with a $CO_2$ net negative solution via increased ocean enabled $CO_2$ absorption.

In general, the seaweed grown and harvested can be used for any suitable purpose including as a nutritional food for human consumption, cosmetics, fodder for animal rearing, feedstock for bio-fuels, bio-ethylene, and other bio-products, which may further enhance the value and benefits of embodiments described herein.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF THE PREFERRED EMBODIMENTS

Figure 1:
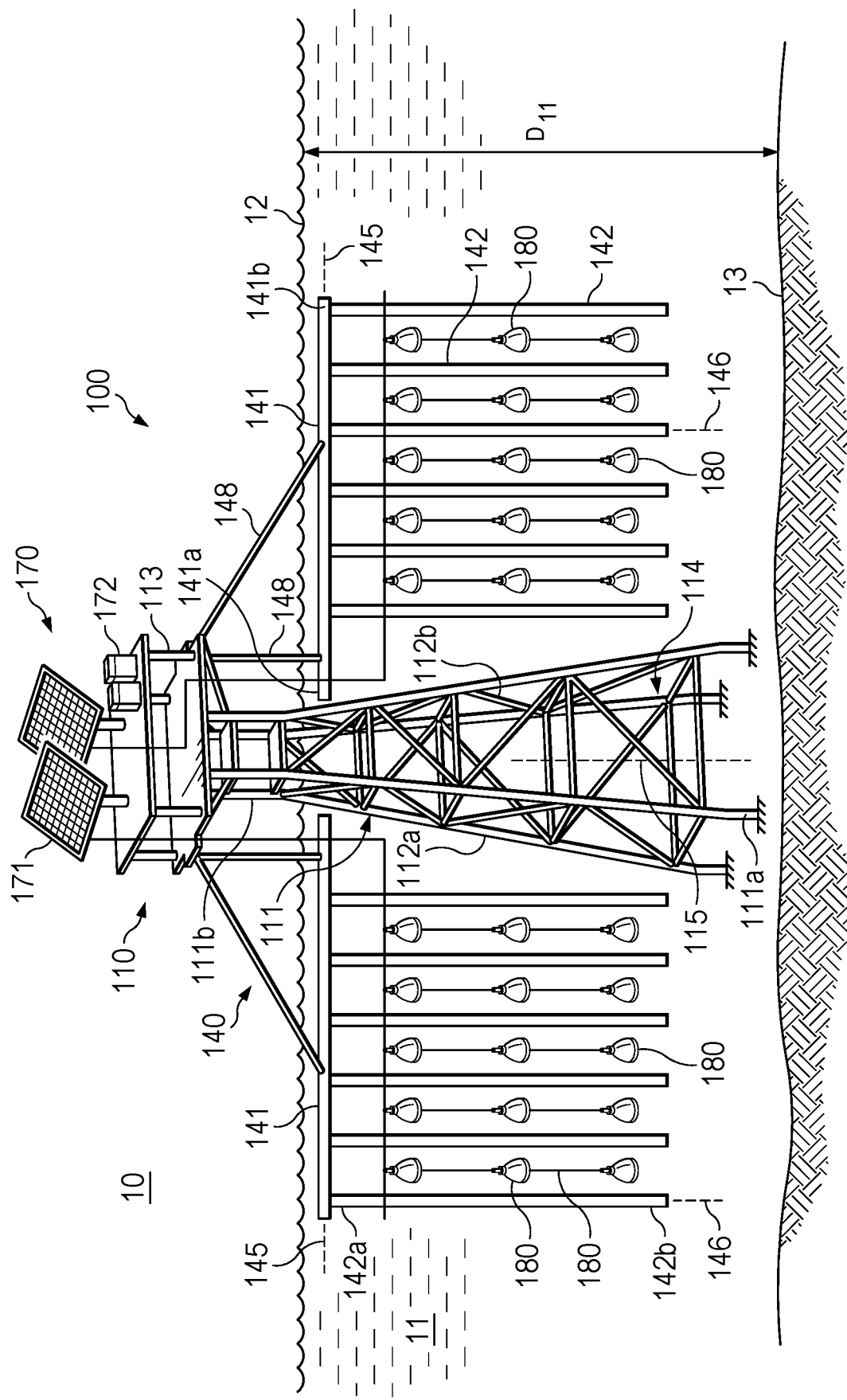
FIG. 1 is a schematic side view of an embodiment of an offshore system for growing and harvesting seaweed in accordance with principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or part), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Figure 2:
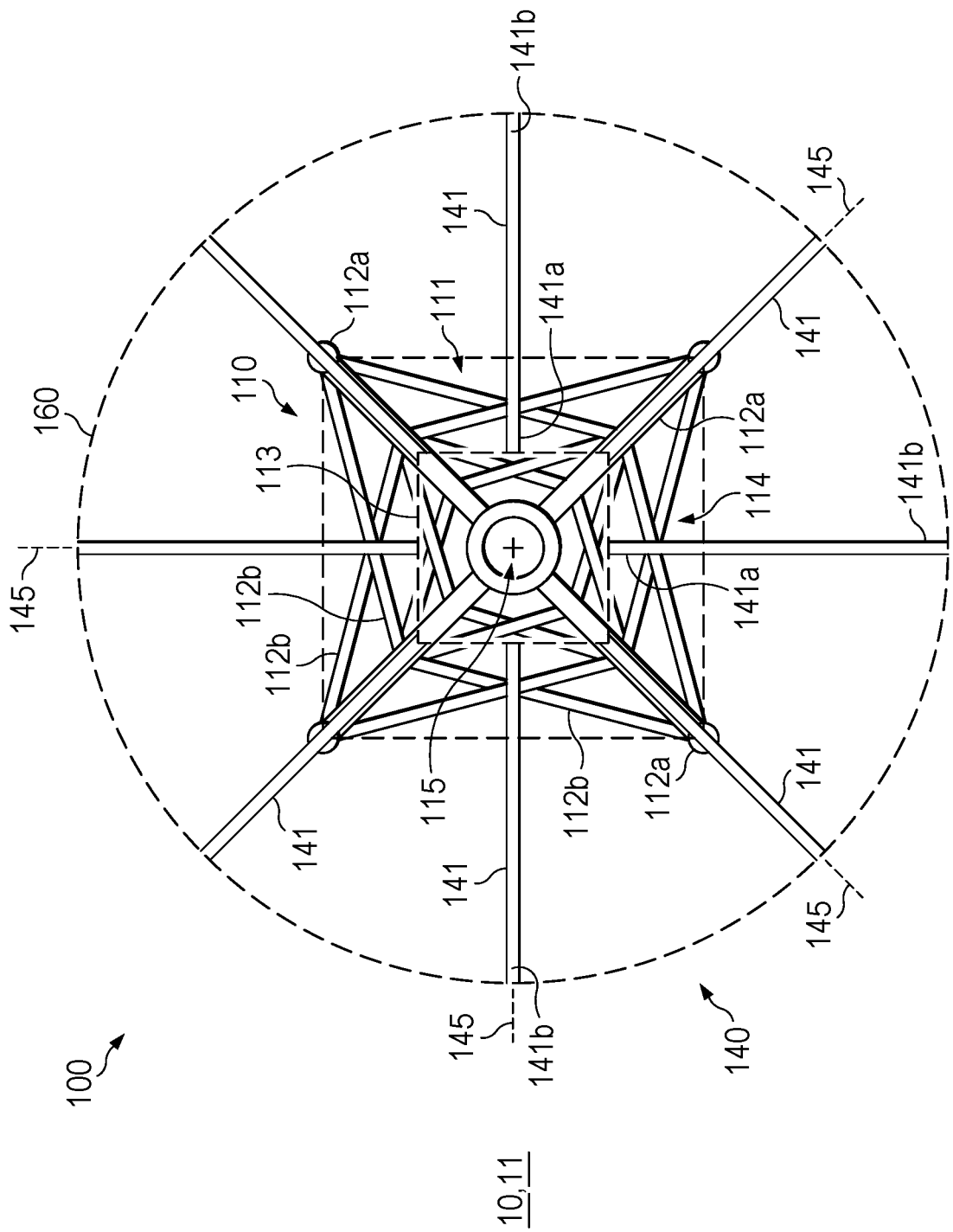
FIG. 2 is a top view of the system of FIG. 1.

Referring now to FIGS. 1 and 2, an embodiment of an offshore system 100 for growing and harvesting seaweed is shown. As previously described, seaweed absorbs absorb carbon-dioxide (CO2) in the oceans, and thus, offshore system 100 can also be described as a system for reducing CO2. System 100 is disposed at an offshore location 10 in a body of water 11 having a depth $D_{11}$ measured vertically from the sea surface 12 to the sea floor 13. In general, system 100 can be used in any depth of water, however, in this embodiment, the depth $D_{11}$ of water 11 can be greater than 100 feet.

In this embodiment, system 100 includes an existing offshore platform 110, a seaweed support assembly 140 coupled to platform 110, a power system 170 coupled to platform 110, and subsea light sources 180 coupled to support assembly 140 and power system 170.

Offshore platform 110 is an existing but currently non-producing oil and/or gas production platform and/or drilling platform. As used herein, the term "non-producing" may be used to refer to an offshore platform that is not producing hydrocarbons such as oil or gas. In general, platform 110 can be a "non-producing" production platform or a "non-producing" drilling platform. In other words, platform 110 is (i) an offshore platform designed and built to produce hydrocarbons (e.g., oil and/or gas) from a subsea well (i.e., a production platform) and/or (ii) an offshore platform designed and built to drill a subsea well for subsequent production of hydrocarbons (i.e., a drilling platform) but is currently not producing any hydrocarbons or engaged in drilling activity. For example, platform 110 may be an offshore production platform associated with one or more wells that have been shut-in or plugged, or otherwise not being used to produce hydrocarbons, or an offshore drilling platform that is not currently being utilized for drilling activities. As shown in FIG. 1, in this embodiment, platform 110 is a bottom-founded offshore structure including a base 111 supported on the sea floor 13 and a topsides or deck 113 sitting atop the base 111 above the surface 12 of the water 11. Base 111 can be a jacket structure or a self-elevating structure having a vertically oriented central or longitudinal axis 115, a first or lower end 111a firmly secured to the sea floor 13, and a second or upper end 111b disposed above the sea surface 12. Thus, a lower portion of the base 111 extending upward from lower end 111a is disposed below the sea surface 12, while an upper portion of the base 111 extending from upper end 111b is disposed above the sea surface 12. Base 111 extends vertically from the sea floor 13 through sea surface 12, and thus, has a height measured parallel to central axis 115 from first end 111a to second end 111b that is greater than the depth $D_{11}$ of the water 11. Deck 113 is firmly mounted to upper end 111b of the base 111, which may be 5 m to 10 m above the sea surface 12. In this embodiment, base 111 is a truss-type structure that is generally rigid but may resiliently flex in response to currents, waves, and wind. Although platform 110 is a fixed, jacketed bottom-founded offshore structure in this embodiment, in other embodiments, the non-producing platform (e.g., platform 110) may be bottom-founded jackup platform or a floating offshore structure such as a tension leg platform, a semi-submersible, a SPAR type offshore platform, etc.

Referring still to FIGS. 1 and 2, seaweed support assembly 140 is coupled to and supported by platform 110. Support assembly 140 includes a plurality of support extensions 141, which may also be referred to herein as "beams" although they may be rigid or flexible, extending horizontally outward from platform 110; a plurality of support extensions 142, which may be referred to herein as "columns" although they may be rigid or flexible, extending vertically downward from each beam 141; and a plurality of support structures or mechanisms 148, which may also be referred to herein as "braces" although they may be rigid or flexible, extending from platform 110 to each beam 141. As shown in FIG. 1, the support beams 141 are position at or just below the sea surface 12, the support columns 142 are disposed subsea (i.e., below the sea surface 12), and the braces 148 extend above the sea surface 12 to beams 141 at or just below the sea surface 12. Thus, braces 148 may extend through the sea surface 12. In general, support beams 141 and support columns 142 provide subsea structures for supporting and facilitating the growth of seaweed (e.g., seaweed may grow along and/or from support beams 141 and support columns 142). As support beams 141 and support columns 142 are at or below the sea surface 12, each is made of a material suitable for offshore, subsea, and metocean conditions. A non-exhaustive list of suitable materials include, without limitation, salt water resistant metals and metal alloys (e.g., carbon steel, stainless steel, aluminum, etc.), polymeric materials, and composite materials (e.g., carbon fiber and epoxy). Any metal or metal alloy materials can be coated with paint to protect the metal or metal alloy from corrosion, or a cathodic protection system employing a sacrificial anode can be used to reduce corrosion of the metal or metal alloy.

As best shown in FIG. 2, support beams 141 are uniformly circumferentially spaced about axis 115 and extend radially outward from base 111. In this embodiment, each support beam 141 is an elongated, linear, horizontally oriented, rigid or flexible element (e.g., I-beam, buoyant rope or pipe, etc.) that is cantilevered from base 111. In particular, each support beam 141 has a horizontally oriented central or longitudinal axis 145, a first or fixed end 141a coupled to base 111, and a second or free end 141b distal base 111. Each support beam 141 has a length measured axially (parallel to corresponding axis 145) from fixed end 141a to free end 141b. In this embodiment, the length of each beam 141 is less than or equal to the pre-permitted "shipping exclusion" zone 160 surrounding the platform 110, which defines the area around the platform 110 within which vessels are restricted from entering and traveling. Such lengths of beams 141 reduce and/or eliminate the risk of a vessel inadvertently contacting or damaging beams 141. To maximize the area and volume for seaweed growth and harvesting, the length of each beam 141 is preferably as large as possible without extending beyond the pre-permitted "shipping exclusion" zone surrounding the platform 110. For most offshore locations, the length of each beam 141 could extend to several hundred feet (e.g., up to 500 feet). More specifically, in embodiments described herein, the length of each beam 141 ranges from 50 feet to 500 feet, and alternatively, ranges from 100 feet to 300 feet. In this embodiment, the length of each beam 141 is the same, however, in other embodiments, the lengths of any two or more beams (e.g., beams 141) can be different.

Referring again to FIG. 1, a plurality of support braces 148 extend from deck 113 of platform 110 to each support beam 141 and assist in maintaining both the circumferential position and horizontal orientation of the corresponding beam 141 relative to the platform 110 and the other beams 141. Support braces 148 are in tension between deck 113 and the corresponding support beam 141, and thus, may be rigid structures or flexible cables.

A plurality of support columns 142 are radially and horizontally spaced along each support beam 141 and extend downward from the corresponding support beam. In particular, each support column 142 has a central or longitudinal axis 146, a first or upper end 142a coupled to the corresponding support beam 141, and a second or lower end 142b distal the corresponding support beam 141. Each support column 142 is generally vertically oriented and has a length measured axially (relative to the corresponding axis 146) from the first end 142a to the second end 142b. Accordingly, central axes 146 of support columns 142 are vertically oriented and parallel to each other. Columns 142 are suspended from and supported by beams 141 and have lengths greater than 5 m and less than the depth $D_{11}$ of the water 11 such that lower ends 142b of columns 142 are spaced above and do not contact the sea floor 13. For most offshore locations, the length of each column 142 ranges from 50 feet to 500 feet, and alternatively ranges from 100 feet to 300 feet. Columns 142 are hung from beams 141, and thus, are in tension. Accordingly, columns 142 can generally be elongate rigid or flexible structures.

Referring still to FIG. 1, power system 170 is disposed on deck 113 and supplies electrical power to offshore system 100 including subsea light sources 180. In this embodiment, power system 170 includes a power source 171, batteries 172 for storing energy produced by power source 171, and an electrical distribution system (not shown in detail) for electrically coupling power source 171, batteries 172, and the devices of system 100 that may require electrical power such as subsea light sources 180. Batteries 172 provide electrical power to offshore system 100 and components thereof via the distribution system as needed. In this embodiment, power source 171 is a renewable power source, and more specifically, comprises solar panels that receives and converts sunlight to electricity that is supplied to and stored by batteries 172. However, in other embodiments, the power source (e.g., power source 171) may convert wind energy, wave energy, or tidal energy into electricity that is supplied to and stored by the batteries (e.g., batteries 172). For example, in other embodiments, the power source comprises one or more wind turbines, one or more wave turbines, or one or more tidal turbines. It should also be appreciated that the power source may convert more than one type of energy into electricity that is supplied to and stored by the batteries (e.g., solar energy, wind energy, tidal energy, wave energy, or combinations thereof).

A plurality of axially spaced (relative to axes 146) subsea light sources 180 are coupled to each support column 142 to provide light for stimulating and support seaweed growth at water depths that may not otherwise receive sufficient natural sunlight to stimulate and support seaweed growth (e.g., depths greater than about 5 meters). In general, light sources 180 can be any source of light, other radiation, or other means to transmit sunlight below sea level to sustain suitable subsea conditions for supporting seaweed growth. By providing such conditions at water depths that may not otherwise receive sufficient natural sunlight to stimulate and support seaweed growth, light sources 180 enhance the area and volume of system 100 that can sustainably support and facilitate seaweed growth. Power system 170 is coupled to light sources 180 and provides electricity to power subsea light sources 180.

In general, seaweed can be grown subsea along beams 141 and/or columns 142. Light to facilitate growth of the seaweed can be supplied by the sun for seaweed proximal the sea surface 12 and/or by light supplied by light sources 180. The seaweed can be periodically harvested for subsequent use.

In this embodiment, base 110 is a jacketed structure. In particular, base 111 includes a plurality of circumferentially spaced legs 112 extending from lower end 111a to upper end 111b and a plurality of cross-members or braces 112b extending laterally and radially between legs 112a. Legs 112a are fixably secured to the sea floor 13 at lower end 111a of base 110. In general, legs 112 can be secured to the sea floor 13 by any suitable means known in the art including, without limitation, piles, suction piles, or the like. The plurality of circumferentially spaced legs 112a and braces 112b define a generally open central region 114 within base 111 that extends from lower end 111a to upper end 111b. Central region 114 can be used for aquaculture activities such as farming of fish, crustaceans, mollusks, aquatic plants, algae, other organisms, or combinations thereof. For example, a fish friendly netting or cage material can be mounted to base 111 around legs 112a and braces 112b to form a fish pen within central region 114. Although base 110 is a generally rectangular jacket structure including four legs 112 in this embodiment, in other embodiments, the base (e.g., base 110) may have other geometries. For example, in other embodiment, the base may be a monopile structure, include three legs, or the base may be a self elevating unit such as employed in connection with jack-up platforms.

It should be appreciated that beams 141 and columns 142 provide a high density, three-dimensional space for growing seaweed to depths in excess of 5 m, which offers the potential to reduce the lateral or horizontal surface area (e.g., square footage of sea space) required to produce a given quantity of seaweed as compared to conventional techniques. The high-density growth region also reduces the need for vessels that may otherwise be necessary to cover a large surface area along the sea surface for harvesting seaweed grown using conventional techniques. As platform 110 was previously used for production operations, it was likely previously permitted and includes a shipping exclusion zone 160, which defines the region about platform 110 within which travel by surface vessels is restricted and/or prevented. Accordingly, seaweed support assembly 140 can be constructed to the boundary defined by the shipping exclusion zone 160 with relatively low risk of interference by surface vessels. In addition, the high-density, single location of system 100 enables system 100 to be managed by a single operator in a relatively efficient manner. Further, the low energy demands of system 100 can be supplied by environmentally friendly energy sources such as solar, wind, tidal, and wave energy sources. It should also be appreciated that the growth of seaweed contributes to global climate change efforts by enhancing absorption of $CO_2$.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An offshore system for growing and harvesting seaweed, the system comprising:
    a non-producing offshore oil or gas platform disposed in a body of water comprising a base having a vertically oriented central axis, a lower end fixably coupled to the seafloor, upper end disposed above a surface of the body of water, and a deck mounted to the upper end of the base above the surface of the body of water; and
    a seaweed support system coupled to the platform and configured to support the subsea growth of seaweed, wherein the seaweed support system comprises:
        a plurality of vertical seaweed support columns extending vertically through the body of water;
        a plurality of horizontal seaweed support beams extending horizontally between an inner end and a longitudinally opposed outer end each horizontally spaced from the platform whereby an opening is formed between the inner end and the platform, wherein the plurality of horizontal seaweed support beams are coupled to the plurality of vertical seaweed support columns whereby the plurality of vertical seaweed support columns are vertically suspended from the plurality of horizontal seaweed support beams; and
        one or more diagonal braces each inclined relative to the central axis of the base and having a first end coupled to the base above the surface of the body of water, and an opposing second end coupled to one of the plurality of horizontal seaweed support beams below the surface of the body of water to cantilever the plurality of horizontal seaweed support beams to the base; and
        a plurality of subsea radiation sources positioned below the surface of the body of the water between the plurality of vertical seaweed support columns, wherein the plurality of subsea radiation sources are configured to promote subsea seaweed growth in areas devoid of natural sunlight.

2. The offshore system of claim 1, wherein the plurality of horizontal seaweed support beams and the plurality of vertical seaweed support columns are positioned below the surface of the body of water.

3. The offshore system of claim 1, wherein the platform is a bottom-founded offshore platform.

4. The offshore system of claim 1, wherein:
    the plurality of horizontal seaweed support beams are circumferentially spaced about the base; and
    the plurality of horizontal seaweed support beams and the plurality of vertical seaweed support columns are disposed below the surface of the body of water.

5. The offshore system of claim 1, further comprising:
    a power source disposed on the deck of the platform configured to supply electrical power to the subsea light sources.

6. The offshore system of claim 1, wherein each of the plurality of horizontal seaweed support beams has a length that ranges from 50 feet to 500 feet.

7. The offshore system of claim 5, wherein each of the plurality of vertical seaweed support column has a length that is at least five meters.

8. An offshore system for growing seaweed to reduce $CO_2$, the system comprising:
    a non-producing offshore oil or gas production or drilling platform disposed in a body of water comprising a base having a vertically oriented central axis, a lower end fixably coupled to the seafloor, an upper end disposed above a surface of a body of water, and a deck mounted to the upper end of the base above the surface of the body of water;
    a seaweed support system coupled to the platform and configured to support the growth of seaweed within the body of water and comprising:
        one or more vertical seaweed support columns extending vertically through the body of water;
        one or more horizontal seaweed support beams extending horizontally between an inner end and a longitudinally opposed outer end each horizontally spaced from the platform whereby an opening is formed between the inner end and the platform, wherein the one or more horizontal seaweed support beams are coupled to the one or more vertical seaweed support columns whereby the one or more vertical seaweed support columns are vertically suspended from the one or more horizontal seaweed support beams; and one or more diagonal braces each inclined relative to the central axis of the base and having a first end coupled to the base above the surface of the body of water, and an opposing second end coupled to the one or more horizontal seaweed support beams below the surface of the body of water to cantilever the one or more horizontal seaweed support beams to the base; and a plurality of strings of axially spaced light sources coupled to the one or more vertical seaweed support columns in the body of water, wherein the strings of light sources are disposed in the body of water at a depth greater than 5 meters.

9. The offshore system of claim 8, wherein
wherein the one or more vertical seaweed support columns are supported by the one or more horizontal seaweed support beams and are configured to support the growth of seaweed in the body of water.

10. The offshore system of claim 8, wherein each of the one or more horizontal seaweed support beams has a length that ranges from 50 feet to 500 feet.

11. The offshore system of claim 8, wherein each of the one or more vertical seaweed support column has a length that is at least five meters.

12. The offshore system of claim 8, wherein the one or more horizontal seaweed support beams and the one or more vertical seaweed support columns are each positioned below the surface of the body of water.

13. The offshore system of claim 8, wherein the platform is a bottom-founded offshore platform.

14. The offshore system of claim 8, wherein the seaweed support system extends horizontally from the platform to a boundary defined by a shipping exclusion zone.

15. The offshore system of claim 8, further comprising:
a renewable power source disposed on a deck of the platform configured to supply electrical power to the strings of light sources.

* * * * *